March 5, 1929.　　　R. J. RILEY　　　1,704,150
SPROCKET WHEEL
Filed March 3, 1927　　　2 Sheets-Sheet 1
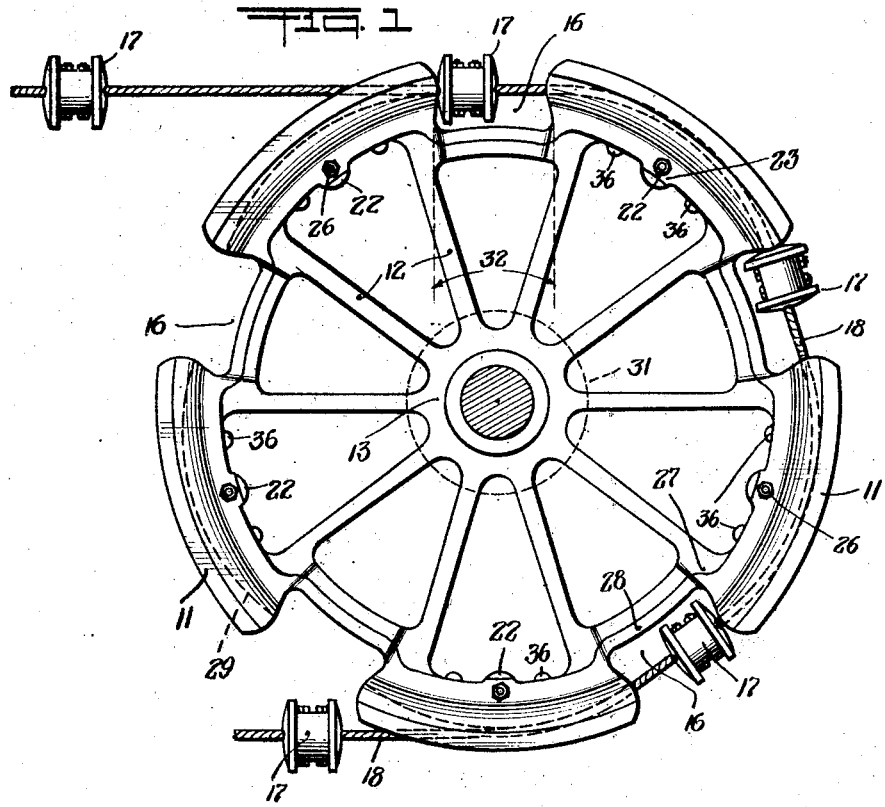
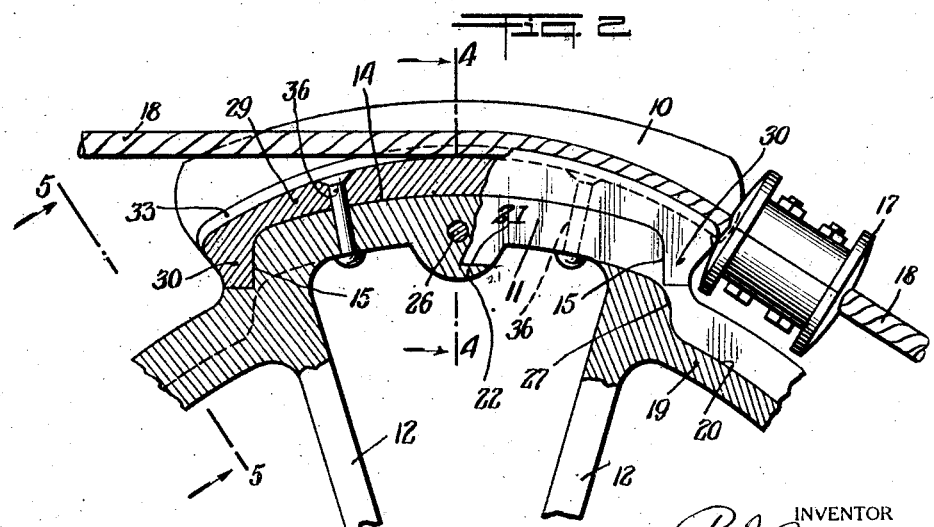
INVENTOR
R. J. Riley
BY Geo. F. Beeler
ATTORNEY

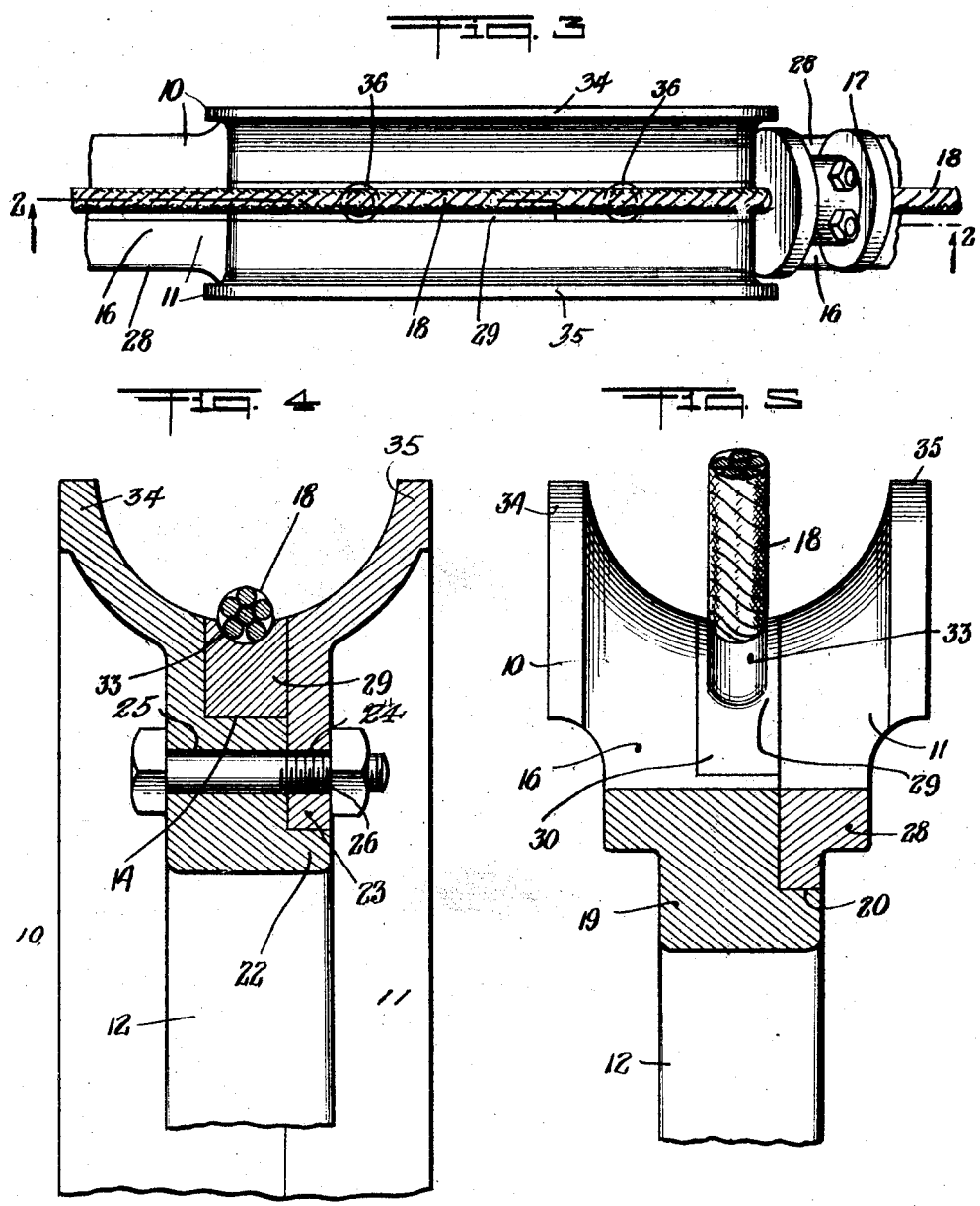

Patented Mar. 5, 1929.

1,704,150

UNITED STATES PATENT OFFICE.

RALPH J. RILEY, OF LIVERMORE FALLS, MAINE.

SPROCKET WHEEL.

Application filed March 3, 1927. Serial No. 172,311.

This invention relates to sprocket wheels for heavy service duty and consists of an improvement on the structure covered by Letters Patent of the United States No. 1,421,832 issued to me on the 4th day of July, 1922.

Among the objects of this invention is to provide for the construction of a heavy duty sprocket wheel in a more advantageous manner than has heretofore been done with respect to the number of parts and manner of assemblage; to provide for ready renewal of those parts of the wheel that are subjected to the most intense wear due to the co-operation therewith of the power cable and buttons; to provide a new design of a sprocket wheel in which the portions engaged by the cable are not only adapted for easy renewal when worn, but are specially shaped to reduce to a minimum the wear and tear upon the cable, and other advantages as will be hereinafter more fully set forth.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a side elevation of a preferred embodiment of my new sprocket wheel showing the relation of the cable and buttons thereto.

Fig. 2 is an enlarged view partly in section on the line 2—2 of Fig. 3.

Fig. 3 is a fragmentary plan view of the structure shown in Fig. 2.

Fig. 4 is a vertical transverse section on the line 4—4 of Fig. 2, and on a larger scale.

Fig. 5 is a similar view on the line 5—5 of Fig. 2.

Referring now more specifically to the drawings I show my improved wheel comprising a plurality of rim sections 10 and 11, section 10 having any suitable arrangement or number of spokes 12 and hub 13. This rim section also is provided with rabbeted seats 14 concentric preferably with the axis of the wheel, each seat being provided with inward extensions 15 at its ends, said extensions having preferably parallel walls opposing each other.

The several sectors of the wheel corresponding to the several seats 14 are spaced from each other circumferentially forming pockets 16 within which the buttons 17 of the cable 18 are adapted to operate. Without unnecessary restriction as to the construction of the walls of these pockets, I indicate that they have no lateral walls, but their bottoms consist of rugged webs 19 having strong unions with those portions of the sectors in which the seats 14 are formed.

The other rim section 11 is shown as being cast or otherwise formed independent of the spokes 12 and seated in a rabbeted seat at 20 formed in the webs 19 and a similar seat 21 formed in each sector having the seat 14 and particularly in an inwardly projected lug 22 at the center thereof. The rim section 11 likewise has inwardly projected lugs 23 each having a hole 24 registering with a similar hole 25 in the lug 22 for the reception of fastening members such as bolts 26 located radially about midway between the seats 14 and 21. As shown also in Fig. 2 the rim member 10 is provided with radial offsets or shoulders 27 adjacent to the seats 15, and the rim member 11 is similarly formed with radially inwardly offset sections 28 co-operating with said shoulders, making a strong circumferential interlock between the two rim sections and relieving the bolts 26 from shearing tendency.

As above premised each sector of the wheel is provided with a wear shoe 29 of arcuate form and whose inner surface or bottom is concentric with the axis of the wheel, fitting against the seat 14, and having end extensions or lugs 30 parallel to each other and fitted against the walls of the seats 15. The outer surface of each shoe is formed in an arc of a circle with a smaller radius than the seat 14, the center of curvature being in an imaginary circle 31 surrounding the hub 13, the design being such that the bounding radius of each of these smaller sectors is spaced in parallel position across the pocket or gap 16 from the corresponding radius of the next sector as shown by the parallel dotted lines 32. This design insures that there will be no angles formed in the cable 18 while co-operating with the wheel. In other words, the cable makes a perfectly arcuate turn over each sector of the wheel and passes in a direct straight line from one sector to the next. Because of the open pocket 16, the cable otherwise would form an angle at the intersection of a pocket and a sector with the result that the cable would tend to break unreasonably soon. The active or outer surface of each shoe is provided also with a cable groove 33, the depth of which corresponds to about one-half of the diameter of the cable.

The rim sections furthermore are provided with outwardly extending flanges 34 and 35 related to each other, as set forth in my previous patent, to accommodate the buttons 17 should for any reason there result a displacement longitudinally of the cable with respect to the wheel, whereby the flanges 34 and 35 will receive the button or buttons and prevent lateral displacement of the cable and buttons from the wheel, a circumstance that occurs very frequently in these large wheels and entails a tremendous amount of labor in restoring the parts to their proper place.

The shoes 29 may be secured in place in the rim portion of the wheel by any suitable means, but preferably by positive devices passing therethrough. As shown herein I provide a plurality of heavy rivets 36 for each shoe passing radially therethrough and through the primary rim structure. The curved surface of the shoe takes the wear of the cable, while the end portions or lugs 30 thereof take the wear resulting from the contact of the buttons thereagainst circumferentially of the wheel. When the shoes become worn they may be replaced with facility without dismounting the wheel. The rivets may be sheared off by a cold chisel or the like, and the shoes will slip radially outward from their respective seats due to the parallelism of the inner walls of the lugs in the seats 15. New shoes will then be slipped into place and fastened as indicated. The wheel may be dismantled by removing the bolts 26 so as to give more ready access to the shoes if desired, but primarily the bolts 26 are intended preferably for the factory assemblage of the wheel, rather than for the renewal of the shoes.

While in the usual practice, the buttons bear against one end only of the wear shoes, it is of extreme importance that each shoe be provided with an extension or abutment end 30 at each end because it is not unusual for the conveyer to be so designed or arranged as to be operated in either direction. Consequently each button may abut against either one end of one wear plate or the opposite end of the next adjacent wear plate as may be elected by the operator. Moreover, each wear plate is in effect doubled in its useful life because from the nature of the construction as set forth above it is expedient for the plates to be reversed especially in the event that the wheels are made to operate in one direction only.

I claim:

1. The herein described sprocket wheel for heavy duty conveyers comprising a pair of rim sections, one section having rabbeted seats to receive the other section, the rim sections having registering holes formed transversely therethrough, and a plurality of fasteners passing through said holes, said rim sections being provided with depressions from their peripheries forming pockets, said sections providing deep arcuate grooves, and a shoe in each of said grooves, said shoe having a lug engaging the first mentioned rim section to prevent circumferential displacement of said shoe, the outer portion of said groove above the shoe forming a guide to prevent a cable from slipping off the wheel.

2. The herein described heavy duty sprocket wheel comprising a rim structure having a series of circumferentially spaced sectors forming pockets, said sectors having each a deep arcuate groove, each sector being provided with a renewable arcuate wear shoe in the bottom of said groove, said shoe having end extensions or lugs serving to lock the shoe from endwise movement.

3. A structure as set forth in claim 2 in which the end lugs of each shoe are provided with parallel inner opposing walls, to permit removal of said shoe by a movement radially outward of said groove.

4. A construction as set forth in claim 2 in which each shoe is formed with an external cable groove extending in the arc of a circle whose radius is shorter than that of the wheel, said pockets being adapted to receive buttons of a cable, said extensions forming abutments for said buttons.

5. The herein described sprocket wheel comprising a pair of rim sections separable laterally from each other, one section having a series of seats corresponding to a similar number of sectors, a renewable cable carrying wear shoe for each sector seated in one of the seats aforesaid and engaging the buttons of the cable, means to lock the shoe in place, the other rim section fitting laterally against the sides of the shoes, and means to secure the rim sections together, each of said shoes having a lug to engage a rim section to prevent circumferential displacement of said shoe.

6. A construction as set forth in claim 5 in which the ends of the wear shoes are spaced circumferentially of the wheel from those of the next shoes forming pockets for cable buttons, and said lugs constitute end abutments for said buttons.

7. The herein described heavy duty sprocket wheel comprising a rim structure having a series of circumferentially spaced sectors forming pockets, said sectors having each a groove, each sector being provided with a renewable arcuate wear shoe in the groove, said shoe having end extensions or lugs serving to lock the shoe from endwise movement, said pockets being adapted to receive the buttons of a cable, said extensions forming abutments for said buttons.

In testimony whereof I affix my signature.

RALPH J. RILEY.